July 21, 1925.

F. LENSER

VEHICLE SPRING SUSPENSION

Filed Feb. 20, 1925

1,546,545

INVENTOR

Ferdinand Lenser

Patented July 21, 1925.

1,546,545

UNITED STATES PATENT OFFICE.

FERDINAND LENSER, OF CINCINNATI, OHIO.

VEHICLE SPRING SUSPENSION.

Application filed February 20, 1925. Serial No. 10,636.

*To all whom it may concern:*

Be it known that I, FERDINAND LENSER, a citizen of the United States, residing at Cincinnati, in the county of Hamilton and State of Ohio, have invented new and useful Improvements in a Vehicle Spring Suspension, of which the following is a specification.

This invention is a development of the patent granted to me upon November 30, 1920, under Number 1,360,419, and has been devised with the object in view of preventing the lifting up of the frame of the chassis from the springs which support it at the rear.

A further object has been to prevent thereby the total displacement of the springs from the frame in the event of such a lifting of this member.

These and other objects are attained in the device described in the following specification and illustrated in the accompanying drawing in which:—

Figure 1:
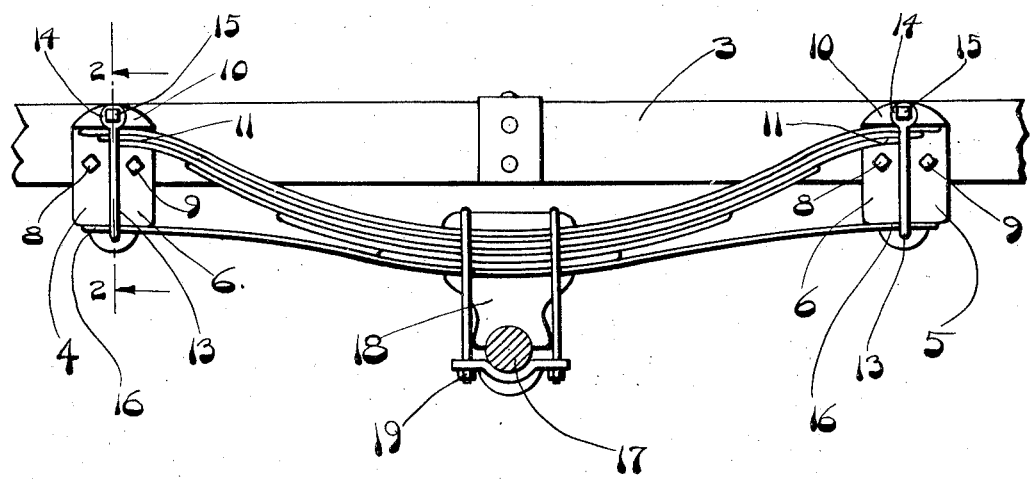
Fig. 1 is a side elevation of the rear portion of a vehicle frame supported on a spring suspension embodying my invention.
Figure 2:
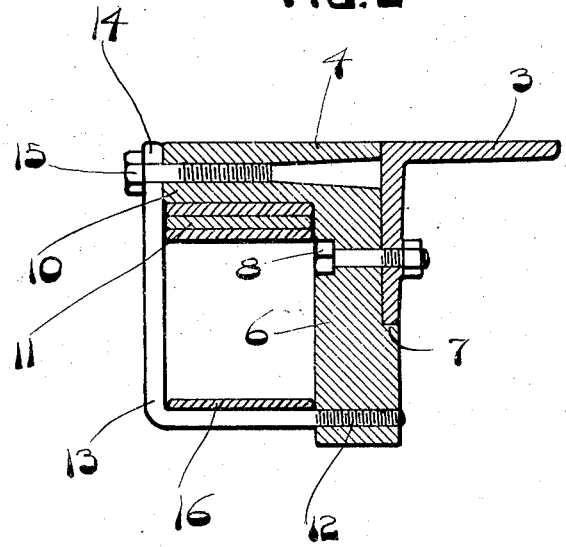
Fig. 2 is a somewhat enlarged transverse sectional view of one side of the vehicle frame and spring mounting thereof, taken on the line 2—2 of Fig. 1.

The frame I have illustrated is of angle iron 3 and has at properly spaced distance from each other two spring supporting bearing plates 4 and 5. Each of these plates is the duplicate of the other and consists of the body portion 6 which has a shoulder 7 for supporting engagement with the angle iron 3 of the frame. Bolts 8 and 9 are employed in recessed position to secure each plate to the frame as is shown in Fig. 2. A spring bearing shelf 10 extends from the plate so that the ends of the load carrying spring leaves 11 are supported thereunder. Mounted in screw threaded position in the body 6 of the plate is the end 12 of an angle bolt 13 which has an eye 14 at its upper end. This eye lies against the outer face of shelf 10 and is secured thereto by a bolt 15 which passes into the shelf 10 as shown in Fig. 2. Against the horizontal branch of the angle bolt lies the end of a special spring leaf 16 which serves as a snubber to check any rebound or lifting tendency of the frame. The spring is attached to the vehicle axle by my patented block 18 and shackle bolts 19 as shown in Fig. 1.

With this construction the inadvertent displacement of the spring leaves from engagement with the shelf 10 is entirely overcome, because bolt 13 positively prevents transverse displacement from the shelf, such as would be occasioned by side-wise-tossing and rebound of the frame during motion of the vehicle. In addition to this, spring 16 is always functioning to prevent excessive rebound of the vehicle frame and consequent tendency to spring breakage.

Having thus described my invention what I claim is:—

1. A vehicle spring suspension comprising in combination with the frame and axle of a vehicle, a spring supporting plate mounted on the frame at each end of the spring to be supported thereby, said plate having a spring engaging shelf extending therefrom, and a spring retaining angle bolt secured at its ends to the plate to form a space between the plate and bolt to retain the spring in position to prevent displacement thereof from the shelf during movement of the vehicle frame relatively to the axle, and a spring mounted on the axle in position to have its ends supported upon the shelves of the plates and within the spaces provided by the bolts with their respective plates.

2. A vehicle spring suspension comprising in combination with the frame and axle of a vehicle, a spring supporting plate mounted on the frame at each end of the spring to be supported thereby, said plate having a spring engaging shelf extending therefrom, and a spring retaining angle bolt secured at its ends to the plate to form a space between the plate and bolt to retain the spring in position to prevent displacement thereof from the shelf during movement of the vehicle frame relatively to the axle, and a leaf spring mounted on the axle in position to have the ends of certain of its leaves supported upon the shelves of the plates and within the spaces provided by the bolts with their respective plates, the ends of certain others of the leaves being adapted to be supported by the bolts within the space between them and the plates, for functioning opposite to that of the leaves supported by the shelves.

In witness whereof, I affix my signature in the presence of two witnesses.

FERDINAND LENSER.

Witnesses:
    PETER SAVIE,
    FRED H. LENSER.